US012571536B2

(12) United States Patent
Cheung

(10) Patent No.: US 12,571,536 B2
(45) Date of Patent: Mar. 10, 2026

(54) MULTI-WALLED STRUCTURE FOR A GAS TURBINE ENGINE

(71) Applicant: Raytheon Technologies Corporation, Farmington, CT (US)

(72) Inventor: Albert K. Cheung, East Hampton, CT (US)

(73) Assignee: RTX CORPORATION, Farmington, CT (US)

( * ) Notice: Subject to any disclaimer, the term of this patent is extended or adjusted under 35 U.S.C. 154(b) by 63 days.

(21) Appl. No.: 16/884,397

(22) Filed: May 27, 2020

(65) Prior Publication Data

US 2021/0372616 A1 Dec. 2, 2021

(51) Int. Cl.
*F23R 3/00* (2006.01)
*F02C 7/16* (2006.01)
*F23R 3/06* (2006.01)

(52) U.S. Cl.
CPC .............. *F23R 3/002* (2013.01); *F02C 7/16* (2013.01); *F23R 3/06* (2013.01); *F23R 2900/03044* (2013.01)

(58) Field of Classification Search
CPC .. F23R 3/002; F23R 3/06; F23R 2900/03044; F23R 2900/03043; F23R 2900/03042; F23R 2900/00018; F23R 2900/03041–03044; F02C 7/16
See application file for complete search history.

(56) References Cited

U.S. PATENT DOCUMENTS 4,446,693 A 5/1984 Pidcock
4,555,901 A * 12/1985 Wakeman ................. F23R 3/08
60/757

4,567,730 A 2/1986 Scott
4,614,082 A * 9/1986 Sterman ................. F23R 3/002
60/800
4,695,247 A 9/1987 Enzaki et al.
4,912,922 A * 4/1990 Maclin .................... F23R 3/002
60/757
5,012,645 A 5/1991 Reynolds
(Continued)

FOREIGN PATENT DOCUMENTS

GB 2298266 A 4/1995

OTHER PUBLICATIONS

EP search report for EP21175644.0 dated Sep. 22, 2021.

*Primary Examiner* — Devon C Kramer
*Assistant Examiner* — Jingchen Liu
(74) *Attorney, Agent, or Firm* — Getz Balich LLC

(57) ABSTRACT

A wall is provided that includes a shell, a heat shield and a cooling cavity. The heat shield includes a first panel and a second panel. The first panel extends longitudinally between a first panel first end and a first panel second end. The first panel includes a first panel base and a first panel rail. The second panel extends longitudinally between a second panel first end and a second panel second end. The second panel at the second panel first end is arranged between and displaced from the shell and the first panel at the first panel second end. The second panel includes a second panel base and a second panel rail. The second panel base includes an uninterrupted surface that extends longitudinally from the second panel rail to the second panel first end. The cooling cavity is bounded by the first panel rail and the second panel rail.

19 Claims, 13 Drawing Sheets

(56)     References Cited

U.S. PATENT DOCUMENTS

| | | | | |
|---|---|---|---|---|
| 6,408,628 | B1 * | 6/2002 | Pidcock | F23R 3/002 |
| | | | | 60/757 |
| 7,363,763 | B2 * | 4/2008 | Coughlan, III | F23R 3/002 |
| | | | | 60/754 |
| 10,344,977 | B2 | 7/2019 | Mulcaire | |
| 2007/0283700 | A1 | 12/2007 | Gerendas | |
| 2008/0134683 | A1 | 6/2008 | Foale | |
| 2008/0264065 | A1 * | 10/2008 | Gerendas | F23R 3/007 |
| | | | | 60/754 |
| 2010/0011775 | A1 | 1/2010 | Garry | |
| 2010/0095679 | A1 | 4/2010 | Rudrapatna | |
| 2015/0292741 | A1 * | 10/2015 | Cunha | F23R 3/06 |
| | | | | 60/752 |
| 2016/0290642 | A1 * | 10/2016 | Kwoka | F23R 3/06 |
| 2017/0009987 | A1 | 1/2017 | Mckinney | |
| 2017/0176005 | A1 * | 6/2017 | Rimmer | F23R 3/002 |
| 2017/0241643 | A1 * | 8/2017 | Mulcaire | F23R 3/06 |
| 2017/0335716 | A1 * | 11/2017 | Bergholz | F01D 5/187 |
| 2018/0238546 | A1 | 8/2018 | Quach | |
| 2018/0266686 | A1 * | 9/2018 | Zelesky | F02C 3/04 |
| 2018/0335211 | A1 * | 11/2018 | Quach | F23R 3/002 |
| 2020/0003423 | A1 | 1/2020 | Porter | |

* cited by examiner

MULTI-WALLED STRUCTURE FOR A GAS TURBINE ENGINE

BACKGROUND OF THE DISCLOSURE

1. Technical Field

This disclosure relates generally to a gas turbine engine and, more particularly, to a wall structure of, for example, a combustor in a gas turbine engine.

2. Background Information

A combustor in a gas turbine engine may be configured with a dual wall structure. The combustor, for example, may have a floating wall structure where a heat shield is attached to an exterior shell. Various types of such dual wall structures are known in the art. These known dual wall structures have various advantages. However, there is still room in the art for improvement. In particular, there is a need in the art for a wall structure with improved cooling characteristics. There is also a need in the art for a wall structure which is less susceptible to foreign matter (e.g., dirt, sand, etc.) accumulation on the heat shield within cooling cavities of the wall structure.

SUMMARY OF THE DISCLOSURE

According to an aspect of the present disclosure, an assembly is provided for a gas turbine engine. This assembly includes a wall which includes a shell, a heat shield and a cooling cavity. The heat shield includes a first panel and a second panel. The first panel extends longitudinally between a first panel first end and a first panel second end. The first panel includes a first panel base and a first panel rail. The second panel extends longitudinally between a second panel first end and a second panel second end. The second panel at the second panel first end is arranged between and is displaced from the shell and the first panel at the first panel second end. The second panel includes a second panel base and a second panel rail. The second panel base includes an uninterrupted surface that extends longitudinally from the second panel rail to the second panel first end. The cooling cavity is longitudinally bounded by the first panel rail and the second panel rail.

According to another aspect of the present disclosure, another assembly is provided for a gas turbine engine. This assembly includes a combustor wall which includes a shell, a heat shield and a cooling cavity. The heat shield includes a first panel and a second panel. The first panel extends longitudinally between a first panel first end and a first panel second end. The second panel extends longitudinally between a second panel first end and a second panel second end. A second panel portion of the second panel at the second panel first end is arranged between and is spaced from the shell and a first panel portion of the first panel at the first panel second end. The cooling cavity extends within the wall from the shell to the first panel and the second panel. At least a portion of the shell that completely longitudinally overlaps at least the first panel and the second panel has a straight linear sectional geometry.

According to still another aspect of the present disclosure, another assembly is provided for a gas turbine engine. This assembly includes a tubular combustor wall which includes a shell, a heat shield and a cooling cavity. The heat shield includes a first panel and a second panel. The first panel extends longitudinally between a first panel first end and a first panel second end. The first panel includes a first panel base and a laterally extending first panel rail. The second panel extends longitudinally between a second panel first end and a second panel second end. A slot is formed by and between a second panel portion of the second panel at the second panel first end and a first panel portion of the first panel at the first panel second end. The second panel includes a second panel base and a laterally extending second panel rail. The second panel base includes an uninterrupted surface that extends longitudinally from the laterally extending second panel rail to the second panel first end. The cooling cavity is formed in the wall by shell and the heat shield. The cooling cavity is longitudinally bounded by the laterally extending first panel rail and the laterally extending second panel rail.

The first panel may include a first panel base and a first panel rail that projects out from the first panel base and engages the shell. The second panel may include a second panel base and a second panel rail that projects out from the second panel base and engages the shell. The cooling cavity may be longitudinally bounded by the first panel rail and the second panel rail.

A slot may be formed by and extend radially between the first panel portion and the second panel portion. The combustor wall may be configured to direct cooling fluid through the slot out of the cooling cavity and into a combustion chamber and longitudinally along the second panel.

The wall may include a slot fluidly coupled with the cooling cavity. The slot may be formed by and may extend between the first panel and the second panel.

The first panel may include a laterally extending stiffener connected to and projecting out from the first panel base at the first panel second end.

The shell may include an aperture configured to direct a jet of cooling fluid at the uninterrupted surface.

A centerline axis of the aperture may be angularly offset from an interior surface of the shell by an acute angle. Alternative, the centerline axis of the aperture may be perpendicular to the interior surface of the shell.

The aperture may also be configured to direct the jet of cooling fluid in a direction longitudinally towards the second panel first end.

The shell may include an aperture configured to direct a jet of cooling fluid at a surface of the first panel base longitudinally between the first panel rail and the first panel second end.

A centerline axis of the aperture may be perpendicular to an interior surface of the shell. Alternatively, the centerline axis of the aperture may be angularly offset from the interior surface of the shell by an acute angle.

The aperture may also be configured to direct the jet of impingement air in a direction longitudinally towards the first panel second end.

The shell may include an aperture configured to direct a jet of cooling fluid at a surface of the second panel base longitudinally between the second panel rail and the second panel second end.

A centerline axis of the aperture may be perpendicular to an interior surface of the shell. Alternatively, the centerline axis of the aperture may be angularly offset from the interior surface of the shell by an acute angle.

The uninterrupted surface may be angularly offset from an interior surface of the shell that forms an outer periphery of the cooling cavity.

At least a portion of the shell that completely longitudinally overlaps the first panel and the second panel may have a straight, linear sectional geometry.

An entirety of the shell may have a straight, linear sectional geometry.

The second panel may be configured as or otherwise include a non-perforated panel.

The first panel may include a ramped portion at a corner between the first panel base and the first panel rail.

The wall may also include a pair of side rails that extend longitudinally along and are connected to the first panel and the second panel.

At least the first panel and the second panel may be formed together as a monolithic body.

The first panel may be formed as a discrete body from the second panel.

The first panel may also include a pair of laterally adjacent first panel rails that are laterally separated by a first distance. The second panel may also include a pair of laterally adjacent second panel rails that are laterally separated by a second distance that is different than the first distance.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
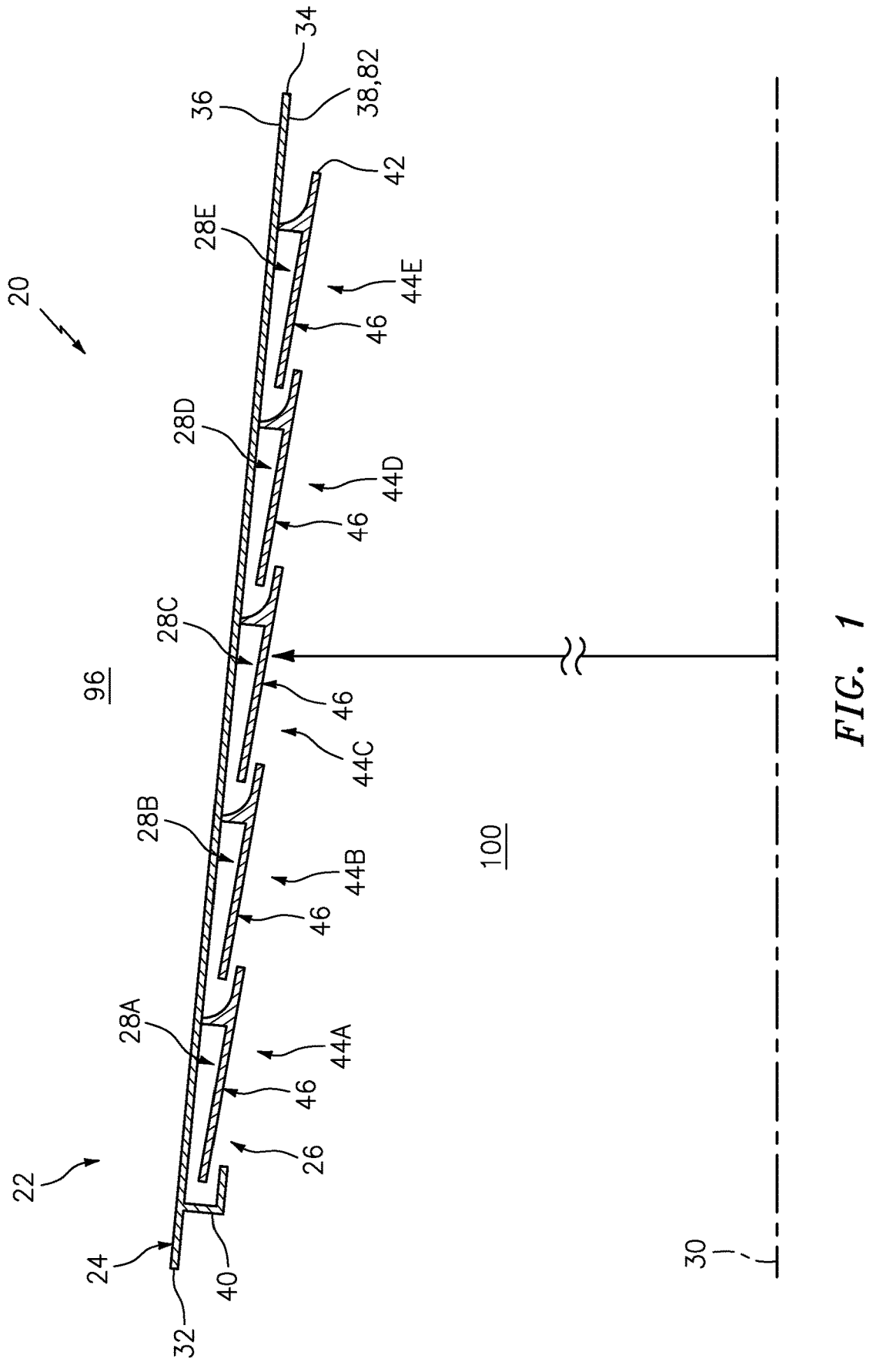
FIG. 1 is a partial side sectional illustration of an assembly with a multi-walled structure.

FIG. 1 illustrates an assembly 20 for a gas turbine engine. This turbine engine assembly 20 includes a multi-walled structure 22 such as, for example, a shingled and/or stepped hollow dual-walled structure. For ease of description, the multi-walled structure 22 is described below as a wall of a combustor of the gas turbine engine. The present disclosure, however, is not limited to such an exemplary combustor application. For example, the multi-walled structure 22 may alternatively be configured as a duct wall or any other multi-walled structure outside of the gas turbine engine combustor.

The multi-walled structure 22 of FIG. 1 includes a shell 24 and a heat shield 26 (also sometimes referred to as a "liner"). The multi-walled structure 22 also includes one or more internal cooling cavities 28A-E (generally referred to as "28").

Figures 2, 3:
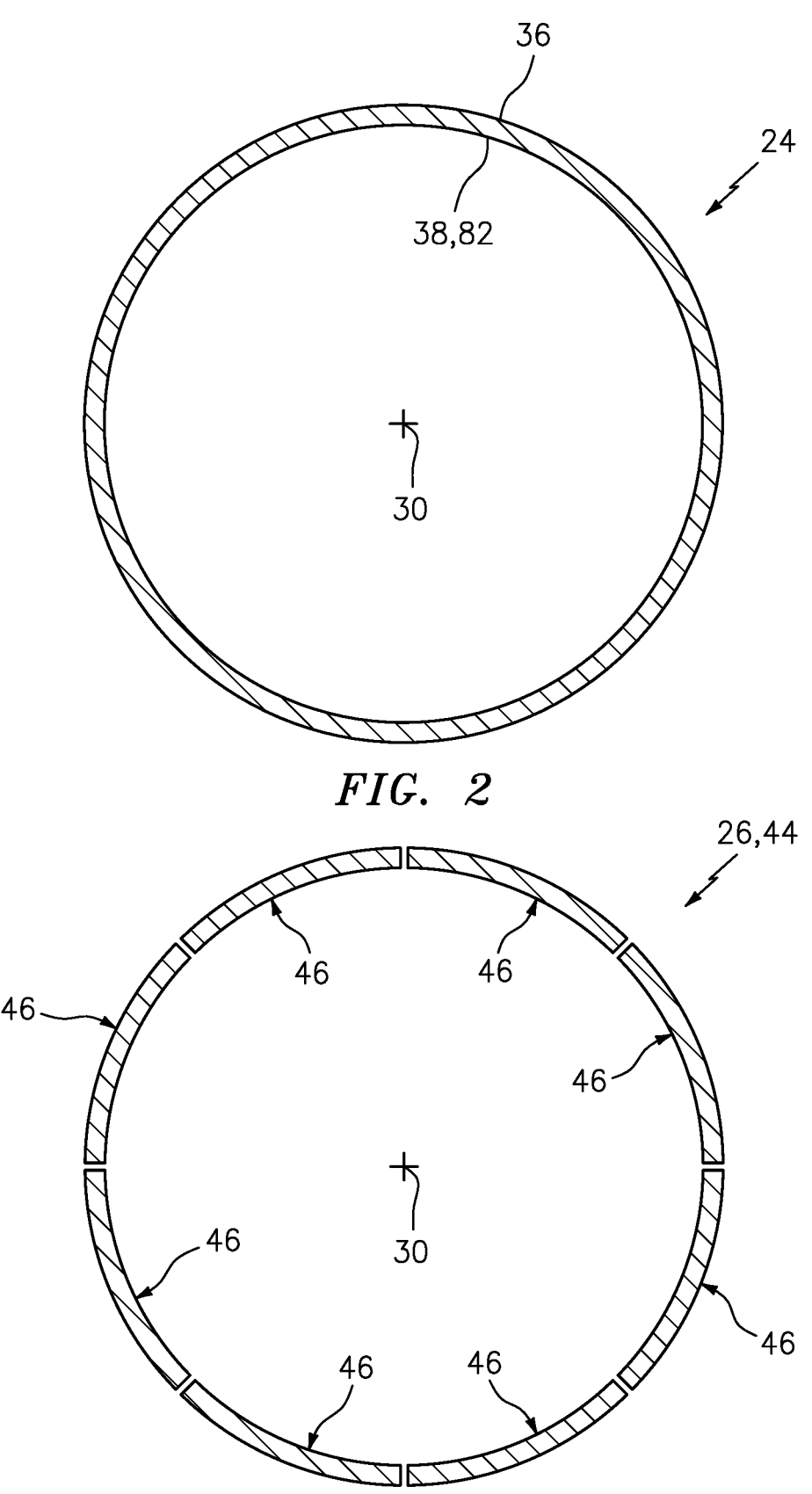
FIG. 2 is a schematic end view illustration of a shell of the multi-walled structure.
FIG. 3 is a schematic end view illustration of a heat shield of the multi-walled structure.

The shell 24 of FIG. 2 extends circumferentially about (e.g., completely around) an axial centerline 30 of the turbine engine assembly 20; e.g., a rotational axis and/or centerline axis of the gas turbine engine. This shell 24 may be configured as a monolithic full hoop body. Referring to FIG. 1, the shell 24 extends longitudinally (e.g., generally axially along the axial centerline 30) between and to a shell first (e.g., forward/upstream) end 32 and a shell second (e.g., aft/downstream) end 34. The shell 24 has a vertical thickness that extends vertically (e.g., generally radially relative to the axial centerline 30) between and to a shell exterior side 36 and a shell interior side 38.

The shell 24 may be constructed from or otherwise include metal or non-metallic material (e.g., sheet material) that can meet the thermal and structural design requirements. The metal may include, but is not limited to, nickel (Ni), aluminum (Al), titanium (Ti), steel, cobalt (Co) and/or an alloy of one or more of the foregoing metals. The non-metallic material may be ceramic such as, but is not limited to, ceramic matrix composite (CMC) material; e.g., SiC/SiC. The present disclosure, however, is not limited to the foregoing exemplary shell materials, nor to metal shells.

The heat shield 26 of FIG. 3 extends circumferentially about (e.g., completely around) the axial centerline 30. Referring to FIG. 1, the heat shield 26 extends longitudinally (e.g., generally axially along the axial centerline 30) between and to a heat shield first (e.g., forward/upstream) end 40 and a heat shield second (e.g., aft/downstream) end 42.

The heat shield 26 of FIG. 1 includes/is formed by a plurality of shingled arrays 44A-E of heat shield panels (generally referred to as "44"). Referring to FIG. 3, each heat shield panel array 44 includes one or more (e.g., arcuate) heat shield panels 46; e.g., heat shield segments. The heat shield panels 46 in each respective array 44 are arranged circumferentially end-to-end so as to provide the heat shield 26 of FIG. 3 with a full hoop segmented body. The heat shield 26 and one or some or each of its heat shield panels 46 may be construct from metal and/or ceramic. The metal may include, but is not limited to, nickel (Ni), aluminum (Al), titanium (Ti), steel, cobalt (Co), beryllium (Be) and/or an alloy of one or more of the foregoing metals. The ceramic may include, but is not limited to, ceramic matrix composite (CMC) material; e.g., SiC/SiC. The present disclosure, however, is not limited to the foregoing exemplary heat shield materials, nor to metal nor ceramic heat shields/panels. The heat shield 26 and its panels 44 can also have a layer of thermal barrier coating (TBC) for additional protection.

Figure 4:
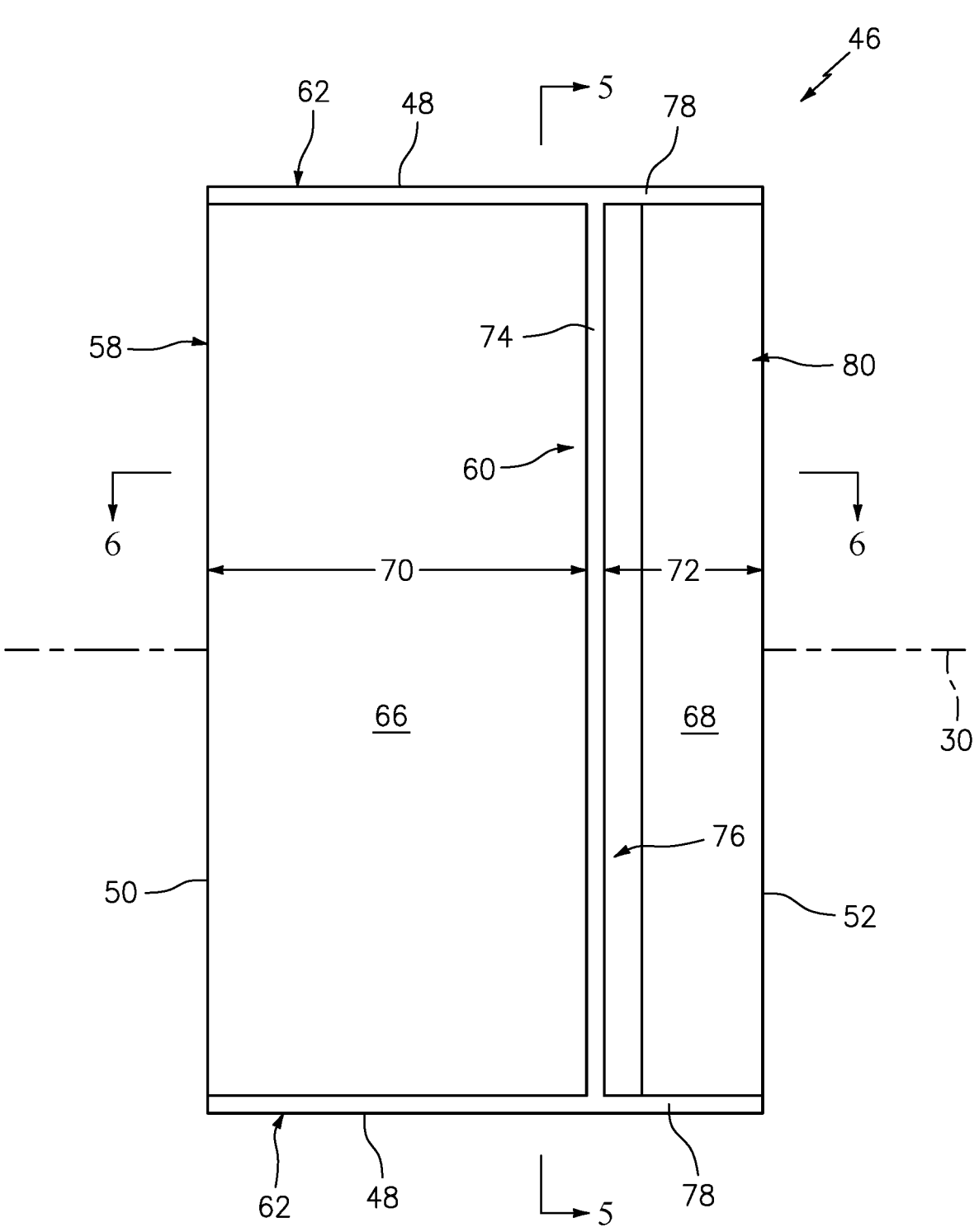
FIG. 4 is a plan view illustration of a heat shield panel.
Figure 5:
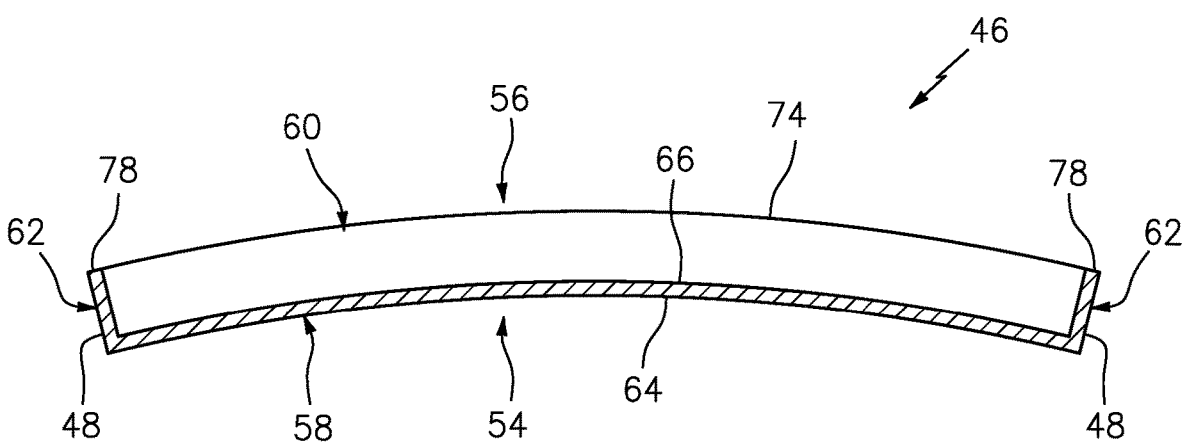
FIG. 5 is a cross-sectional illustration of the heat shield panel taken along line 5-5 in FIG. 4.
Figure 6:
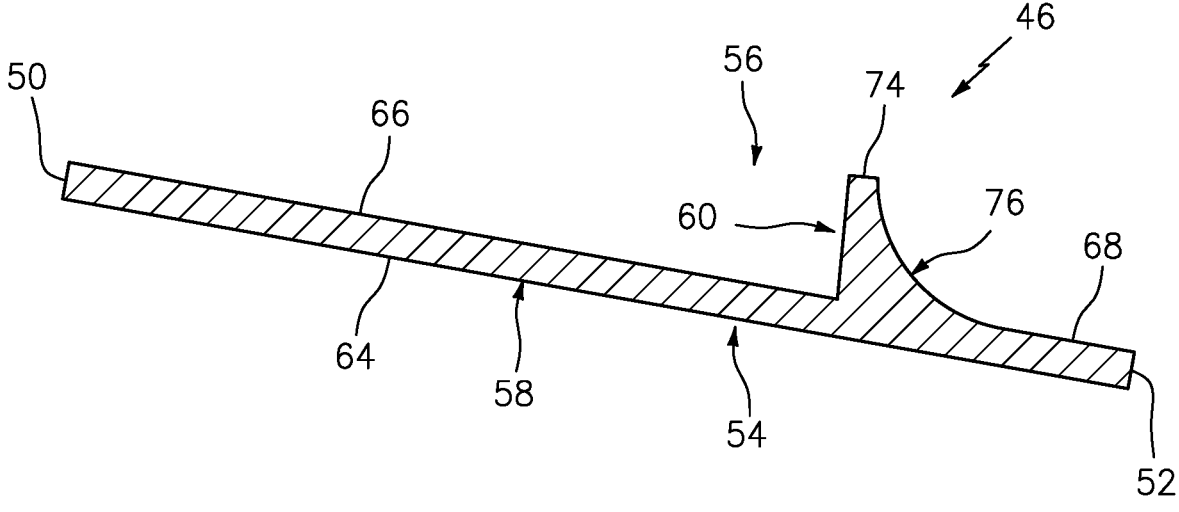
FIG. 6 is a side sectional illustration of the heat shield panel taken along line 6-6 in FIG. 4.
Figure 6:

Referring to FIG. 4, each heat shield panel 46 extends laterally (e.g., generally circumferentially about the axial centerline 30) between and to opposing panel sides 48; see also FIG. 5. Each heat shield panel 46 extends longitudinally (e.g., generally axially along the axial centerline 30) between and to a panel first (e.g., forward/upstream) end 50 and a panel second (e.g., aft/downstream) end 52; see also FIG. 6. Referring to FIG. 6, each heat shield panel 46 extends vertically (e.g., generally radially relative to the axial centerline 30) between and to a panel exterior side 54 (e.g., hot side) and a panel interior side 56 (e.g., cold side).

Each heat shield panel 46 of FIGS. 4-6 includes a panel base 58 and one or more panel rails. The panel rails of FIGS. 4-6 include a lateral rail 60 (e.g., a centrally located rail) and a plurality of longitudinal rails 62 (e.g., side rails).

The panel base 58 extends laterally between and to the opposing panel sides 48. The panel base 58 extends longitudinally between and to the panel first end 50 and the panel second end 52. The panel base 58 extends vertically from an exterior heat shield panel surface 64 (e.g., a hot side surface) on the panel exterior side 54 to interior heat shield panel surfaces 66 and 68 (e.g., cold side surfaces) towards the panel interior side 56. The panel base 58 of FIG. 6 is configured with a straight, linear sectional geometry when viewed, for example, in a plane parallel with the axial centerline 30; e.g., the plane of FIG. 6. The present disclosure, however, is not limited to such an exemplary panel base sectional geometry.

Each of the surfaces 64, 66 and 68 of FIGS. 4-6 may be configured as an uninterrupted surface. Each of the surfaces 64, 66 and 68, for example, may be a smooth arcuate planar surface (e.g., a cylindrical or conical surface) configured without (e.g., lateral and/or longitudinal) interruptions such as, but not limited to, apertures and/or protuberances. Examples of apertures include, but are not limited to dimples, channels, slots, through-holes, etc. Examples of protuberances include, but are not limited to, bumps, pins, rails, humps or other such protrusions. With such a configuration, the panel base 58 and, thus, the heat shield panel 46 more generally may be configured without any cooling features (e.g., pins, chevrons, etc.) and/or without any cooling holes (e.g., effusion apertures, etc.). The present disclosure, however, is not limited to such an exemplary configuration.

The exterior heat shield panel surface 64 of FIG. 5 extends laterally between and to the opposing panel sides 48. The exterior heat shield panel surface 64 of FIG. 6 extends longitudinally between and to the panel first end 50 and panel second end 52.

The first (e.g., forward/upstream) interior heat shield panel surface 66 of FIG. 4 extends laterally between and to the longitudinal rails 62. The first interior heat shield panel surface 66 extends longitudinally between and to the lateral rail 60 and the panel first end 50.

The second (e.g., aft/downstream) interior heat shield panel surface 68 extends laterally between and to the longitudinal rails 62. The second interior heat shield panel surface 68 extends longitudinally between and to the lateral rail 60 and the panel second end 52.

Referring to FIG. 4, the lateral rail 60 is located longitudinally intermediately between the panel first end 50 and the panel second end 52. More particularly, the lateral rail 60 is disposed a longitudinal first distance 70 from the panel first end 50. The lateral rail 60 is disposed a longitudinal second distance 72 form the panel second end 52. The longitudinal first distance 70 may be different (e.g., greater) than the longitudinal second distance 72. The longitudinal first distance 70, for example, may be at least one (1) to as much as four (4) or more times greater than the longitudinal second distance 72. The present disclosure, however, is not limited to the foregoing exemplary longitudinal first to second distance ratios.

The lateral rail 60 is configured as a laterally extending rail. The lateral rail 60 of FIG. 4, for example, extends laterally between and to the longitudinal rails 62. The lateral rail 60 of FIG. 7 projects vertically out from the panel base 58 to a distal end 74 configured to engage (e.g., contact) the shell 24. The lateral rail 60 of FIG. 6 is configured with a ramped portion 76 (e.g., a ramp, a fillet, etc.) at a corner between the panel base 58 and the lateral rail 60. This ramped portion 76 may also extend laterally between and to the longitudinal rails 62 as shown in FIG. 4. Of course, in other embodiments, the lateral rail 60 may be configured without the ramped portion 76.

Each longitudinal rail 62 of FIG. 4 is located at (e.g., on, adjacent or proximate) a respective panel side 48. Each longitudinal rail 62 of FIG. 4 extends longitudinally along an entire longitudinal length of the panel base 58 between and to the panel first end 50 and the panel second end 52. Each longitudinal rail 62 projects vertically out from the panel base 58 to a distal end 78 configured to engage (e.g., contact) the shell 24 (similar to distal end 74 in FIG. 7). Referring to FIG. 5, a vertical height of each longitudinal rail may be equal to a vertical height of the lateral rail 60 at least, for example, at a point of intersection between the rails 60 and 62.

Referring to FIG. 1, each heat shield panel 46 is shingled with at least one longitudinally adjacent/neighboring of the heat shield panels 46. For example, the central heat shield panel 46A of FIG. 7 (e.g., any one of the heat shield panels 46 in any one of the arrays 44B-44D in FIG. 1) at its panel first end 50 is arranged between and spaced from the shell 24 and the forward/upstream heat shield panel 46B at its panel second end 52. More particularly, a first (e.g., forward/upstream) portion of the central heat shield panel 46A at its panel first end 50 projects longitudinally into a vertical gap formed by and between the shell 24 and a second (e.g., aft/downstream) portion of the of the forward/upstream heat shield panel 46B. With this configuration, the first portion longitudinally and laterally overlaps and is displaced from the second portion and the shell 24. A cooling cavity outlet 80A (e.g., a laterally extending slot) is thereby formed vertically between the two heat shield panels 46. This cooling cavity outlet 80A extends vertically between the first portion and the second portion. The cooling cavity outlet 80A extends laterally between respective longitudinal rails 62 (see 80 in FIG. 4).

Similarly, the aft/downstream heat shield panel 46C at its panel first end 50 is arranged between and spaced from the shell 24 and the central heat shield panel 46A at its panel second end 52. More particularly, a first (e.g., forward/upstream) portion of the aft/downstream heat shield panel 46C at its panel first end 50 projects longitudinally into a vertical gap formed by and between the shell 24 and a second (e.g., aft/downstream) portion of the of the central heat shield panel 46A. With this configuration, the first portion longitudinally and laterally overlaps and is displaced from the second portion and the shell 24. A cooling cavity outlet 80B (e.g., a laterally extending slot) is thereby formed vertically between the two heat shield panels 46. This cooling cavity outlet 80B extends vertically between the first portion and the second portion. The cooling cavity outlet 80B extends laterally between respective longitudinal rails 62 (see 80 in FIG. 4).

Each cooling cavity outlet 80A, 80B (generally referred to as "80") is fluidly coupled with and is an outlet (e.g., a sole/only outlet) for a respective one of the cooling cavities 28. Each cooling cavity 28 is forming within the multi-walled structure 22 vertically between the shell 24 and the heat shield 26. The central cooling cavity 28A of FIG. 7 (e.g., any one of the cooling cavities 28 associated with any one of the arrays 44B-44D in FIG. 1), for example, extends vertically from an interior surface 82 of the shell 24 to the respective interior surfaces 66 and 68 of the longitudinally adjacent/neighboring heat shield panels 46A and 46B. The central cooling cavity 28A is longitudinally bounded by the lateral rails 60 of the longitudinally adjacent/neighboring heat shield panels 46A and 46B. The central cooling cavity 28A is laterally bounded by respective longitudinal rails 62 (see FIG. 4).

Each cooling cavity 28 is also fluidly coupled with one or more apertures 84 and 86 in the shell 24. Each of these apertures 84, 86 may be configured as an impingement aperture.

Figure 7:
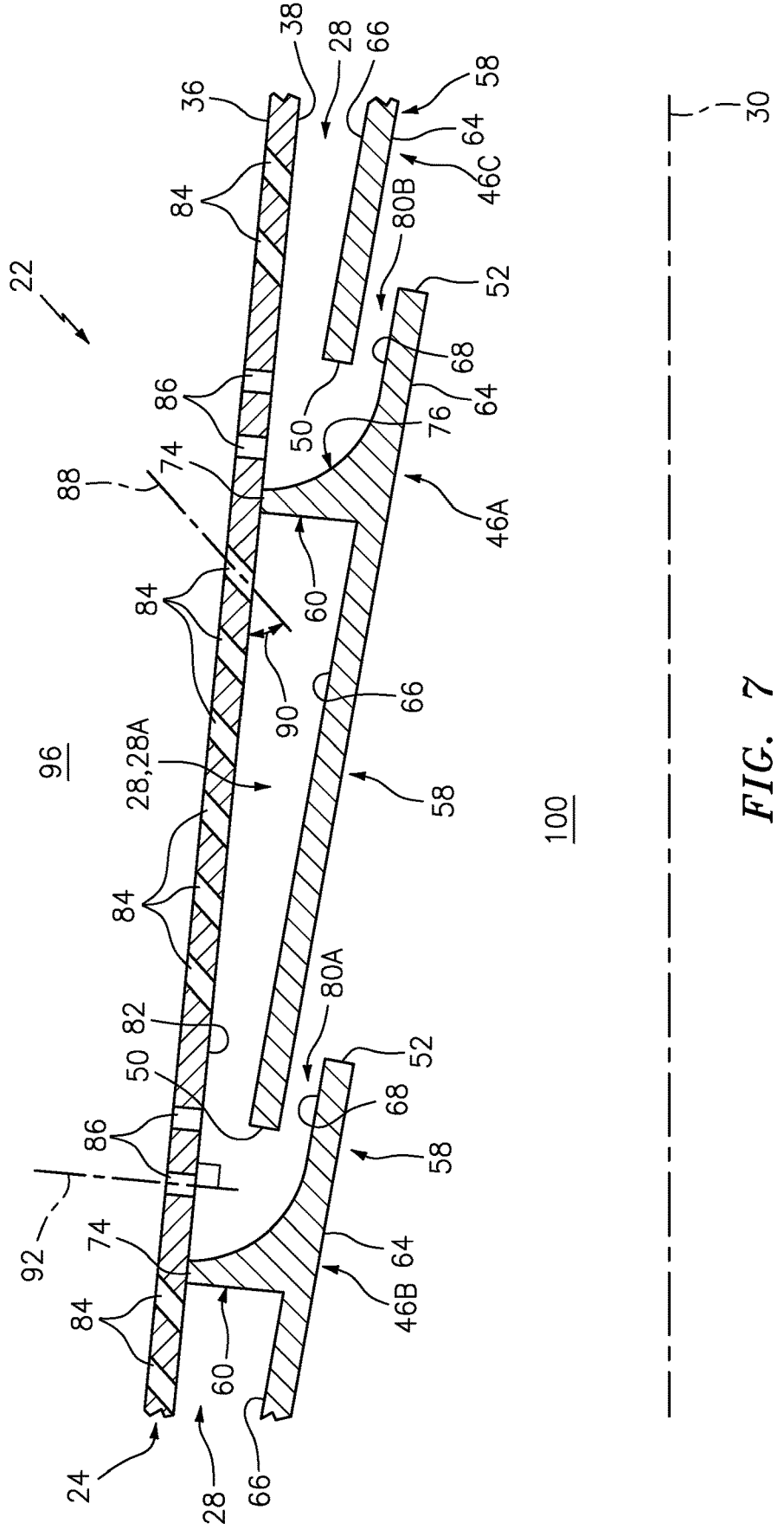
FIG. 7 is a side sectional illustration of a portion of the multi-walled structure.
Figure 8:
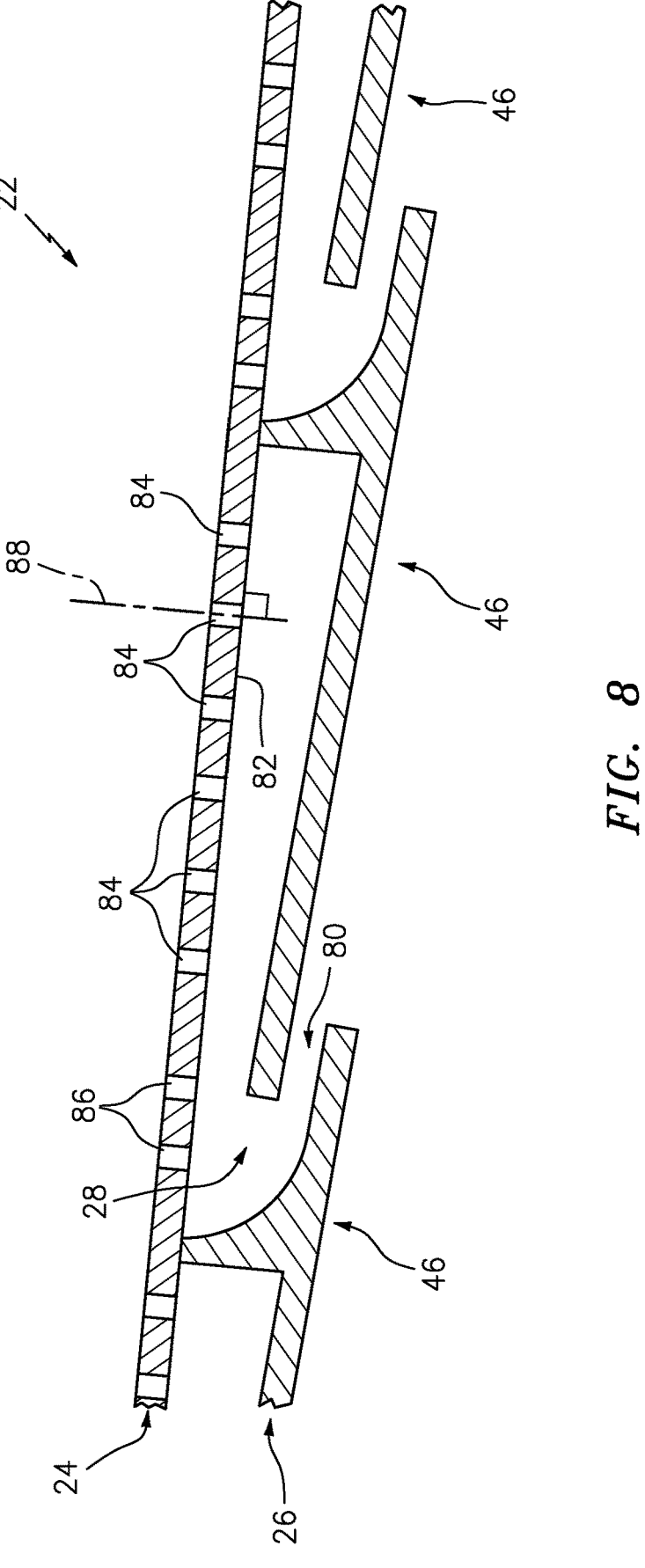
FIG. 8 is a side sectional illustration of a portion of the multi-walled structure configured with an alternative shell aperture configuration.

The apertures 84 of FIG. 7 are arranged longitudinally along a longitudinal length of the interior surface 66. Each aperture 84 is configured to direct a jet of cooling fluid (e.g., air) vertically through the cooling cavity 28 and against the interior surface 66. Each aperture 84 may have a centerline axis 88 that is angularly offset from the shell interior surface 82 by an included angle 90; e.g., an acute angle. The centerline axis 88 may be positioned/tilted such that the jet of cooling fluid is directed longitudinally towards the panel first end 50. The present disclosure, however, is not limited to the foregoing exemplary aperture configuration. For example, referring to FIG. 8, the centerline axis 88 may be perpendicular to the shell interior surface 82.

Figure 9:
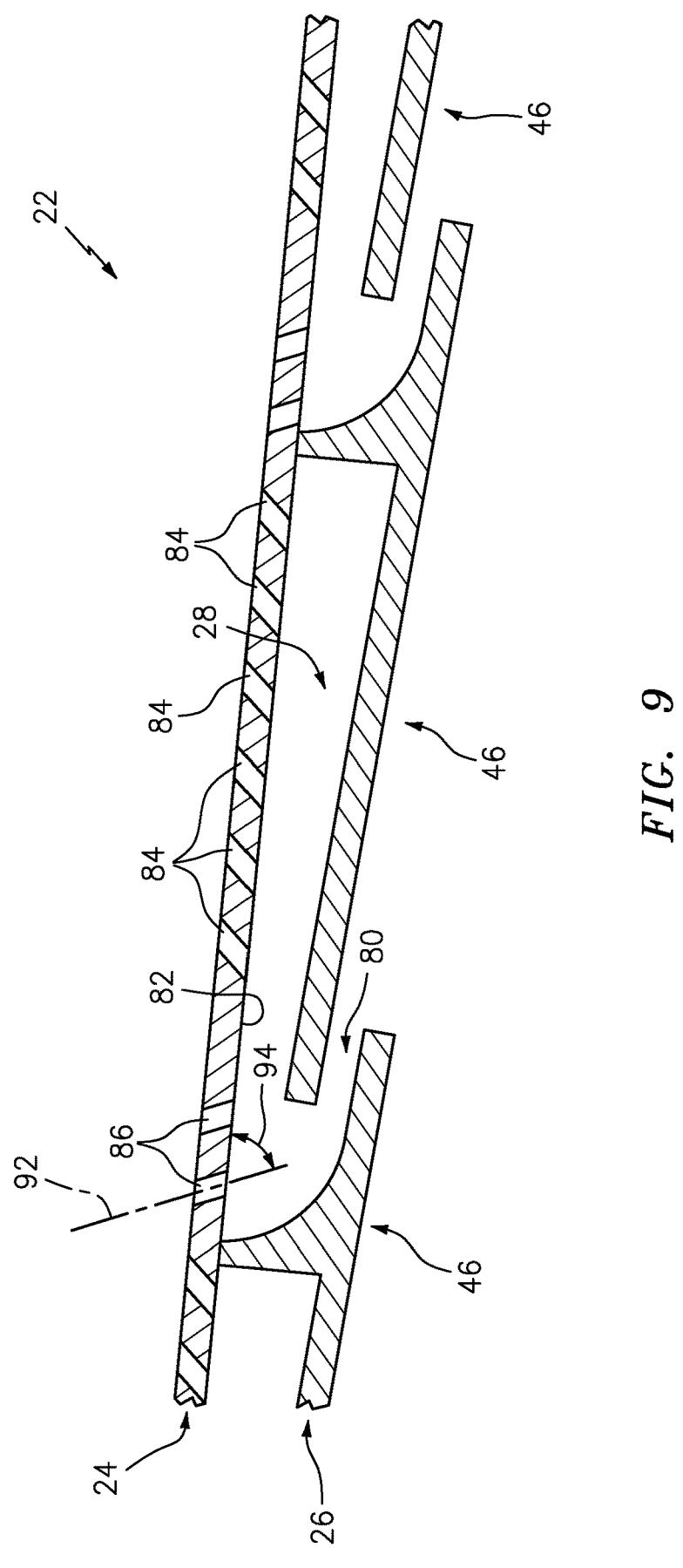
FIG. 9 is a side sectional illustration of a portion of the multi-walled structure configured with another alternative shell aperture configuration.

The apertures 86 of FIG. 7 are arranged longitudinally along the interior surface 68 proximate the lateral rail 60. Each aperture 86 is configured to direct a jet of cooling fluid (e.g., air) vertically through the cooling cavity 28 and against the interior surface 68 and/or the ramped portion 76. Each aperture 86 may have a centerline axis 92 that is perpendicular to the shell interior surface 82. The present disclosure, however, is not limited to the foregoing exemplary aperture configuration. For example, referring to FIG. 9, the centerline axis 92 may be angularly offset from the shell interior surface 82 by an included angle 94; e.g., an acute angle. The centerline axis 92 may be positioned/tilted such that the jet of cooling fluid is directed longitudinally towards the panel second end 52 and the cooling cavity outlet 80.

Figure 10:
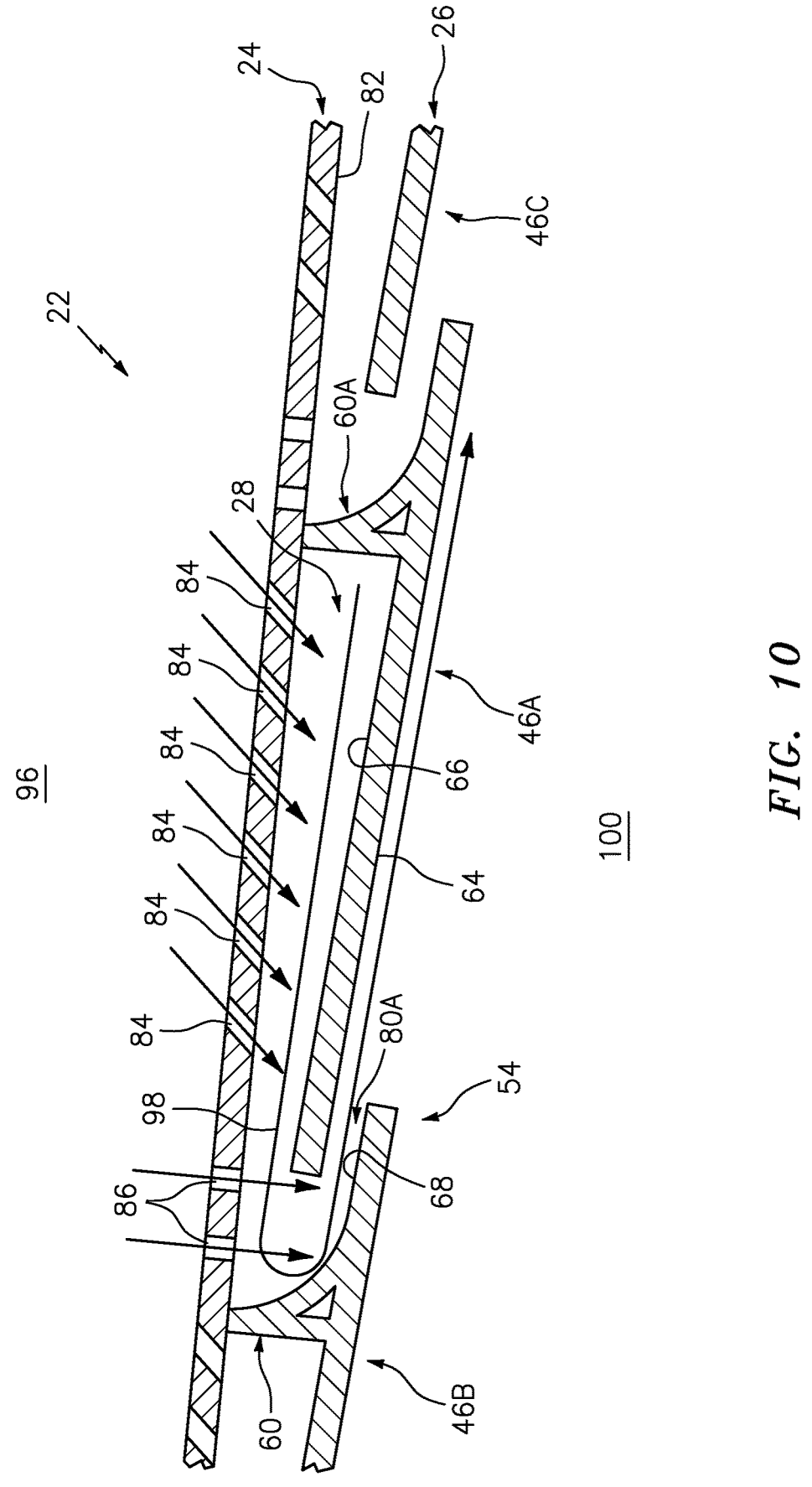
FIG. 10 is a side sectional illustration of the multi-walled structure portion of FIG. 7 during operation.

During operation of the multi-walled structure 22 of FIG. 10, cooling fluid from a plenum 96 adjacent the shell 24 enters each cooling cavity 28 through the apertures 84 and 86. In particular, the apertures 84 direct the cooling fluid against the interior surface 66 and the apertures 86 direct the cooling fluid against the interior surface 68. The cooling fluid thereby impingement cools the backside of the heat shield 26 and the respective two longitudinally adjacent/neighboring panels 64. After impinging against the heat shield 26 within the cavity 28, the cooling fluid follows a reverser flow path 98 from the downstream lateral rail 60A to the cooling cavity outlet 80A. The cooling fluid thereby may provide convective cooling for the backside of the heat shield 26. The cooling cavity outlet 80A subsequently directs the cooling air out of the multi-walled structure 22 into a combustion chamber 100 (or another plenum) adjacent the heat shield interior side 54. As the cooling fluid exits the cooling cavity outlet 80A, it may flow along the respective downstream exterior surface 64 thereby providing a cooling fluid barrier (e.g., film) between the heat shield 26 and, for example, hot combustion gases within the combustion chamber 100. Providing such a flow of cooling fluid substantially parallel with the downstream exterior surface 64 may also reduce convection as compared to a panel with effusion apertures where cooling fluid mixes with the hot combustion gases adjacent the panel.

The foregoing multi-walled structure 22 may also reduce deposition/accumulation of foreign matter (e.g., dirt, sand, etc.) on the backside of the heat shield 26 (e.g., on the surfaces 66 and/or 68). For example, referring to FIG. 7, the angle 90 of the apertures 84 may reduce the force with which foreign matter impacts against the respective interior surface 66 and, thus, reduces the likelihood that the foreign matter sticks to and accumulates on the interior surface 66.

Figures 11, 12, 13:
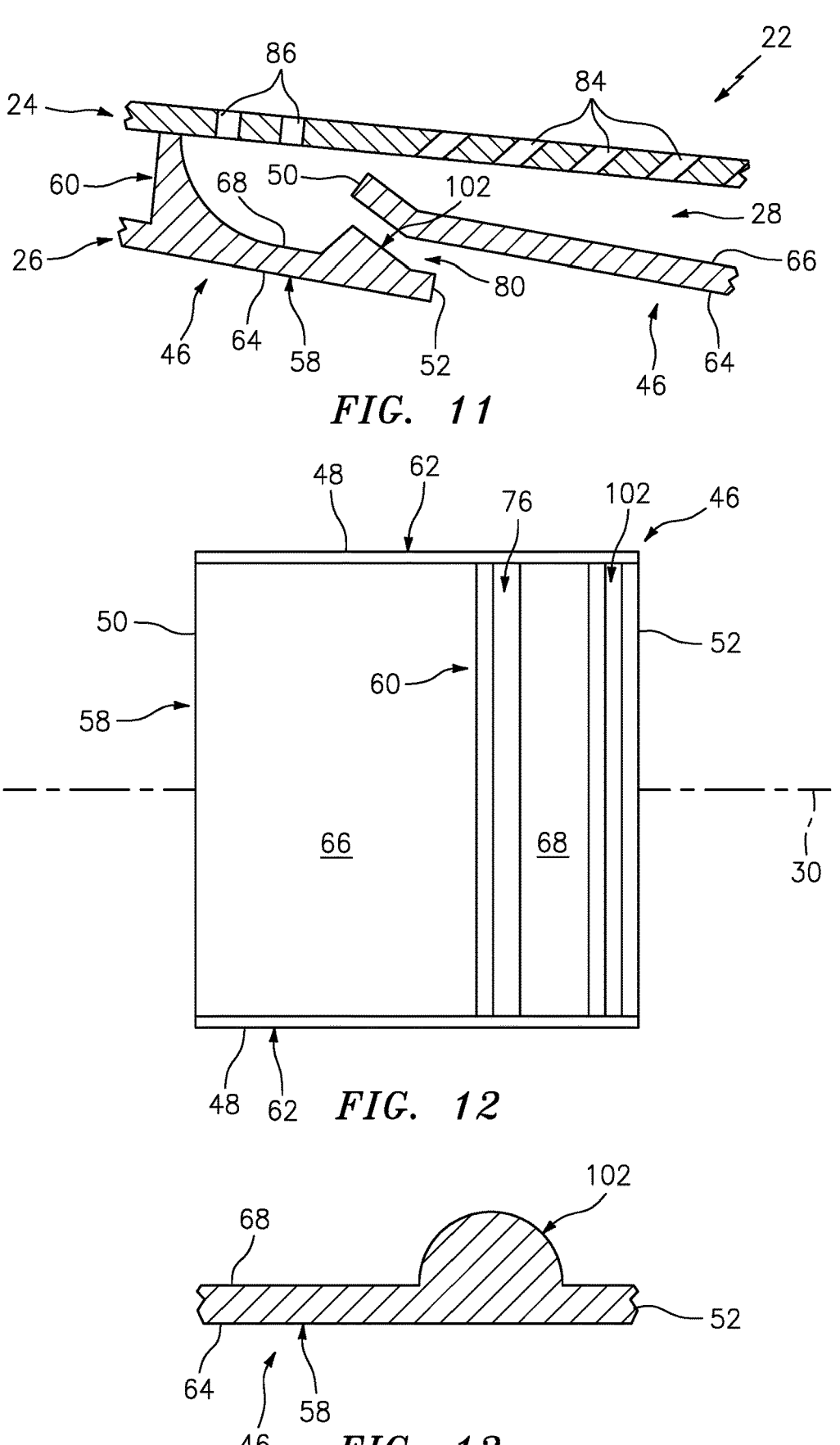
FIG. 11 is a side sectional illustration of a portion of the multi-walled structure configured with a heat shield panel stiffener.
FIG. 12 is a plan view illustration of the heat shield panel configured with the heat shield panel stiffener.
FIG. 13 is a side sectional illustration of a portion of the heat shield panel configured with an alternative heat shield panel stiffener.

In some embodiments, referring to FIGS. 11 and 12, one, some or each heat shield panel 46 may also include a lateral stiffener 102. The stiffener 102 of FIGS. 11 and 12, for example, is located at (e.g., on, adjacent or proximate) the panel second end 52. This stiffener 102 extends laterally between respective longitudinal rails 62. Referring to FIG. 11, the stiffener 102 projects vertically out from the panel base 58 into the cooling cavity 28 towards, but not to, the panel first end 50 of a longitudinal adjacent/neighboring one of the heat shield panels 46. This stiffener 102 may be configured to increase uniformity of the cooling fluid film expelled from the cooling cavity outlet 80.

The stiffener 102 of FIG. 11 has a polygonal (e.g., triangular) cross-sectional geometry. The present disclosure, however, is not limited to such an exemplary cross-sectional geometry. The stiffener 102 of FIG. 13, for example, has a partially circular (e.g., half-circle) cross-sectional geometry.

In some embodiments, referring to FIG. 1, at least a portion (or an entirety) of the shell 24 completely longitudinally overlapping some or all of the heat shield panels 46 may be configured with a straight, linear sectional geometry when viewed, for example, in a plane parallel with the axial centerline 30; e.g., the plane of FIG. 1. The present disclosure, however, is not limited to such an exemplary shell sectional geometry.

In some embodiments, referring to FIG. 7, one, some or each of the surfaces 64, 66 and 68 of one, some or each heat shield panel 46 may be angularly offset from (e.g., non-parallel with) the surface 82 of the shell 24. Thus, one, some or each heat shield panel 46 may be angularly offset from the shell 24. In particular, the panel first end 50 may be positioned closer to the shell 24 than the panel second end 52 of the same panel 46. The present disclosure, however, is not limited to such an exemplary configuration.

Figure 14:
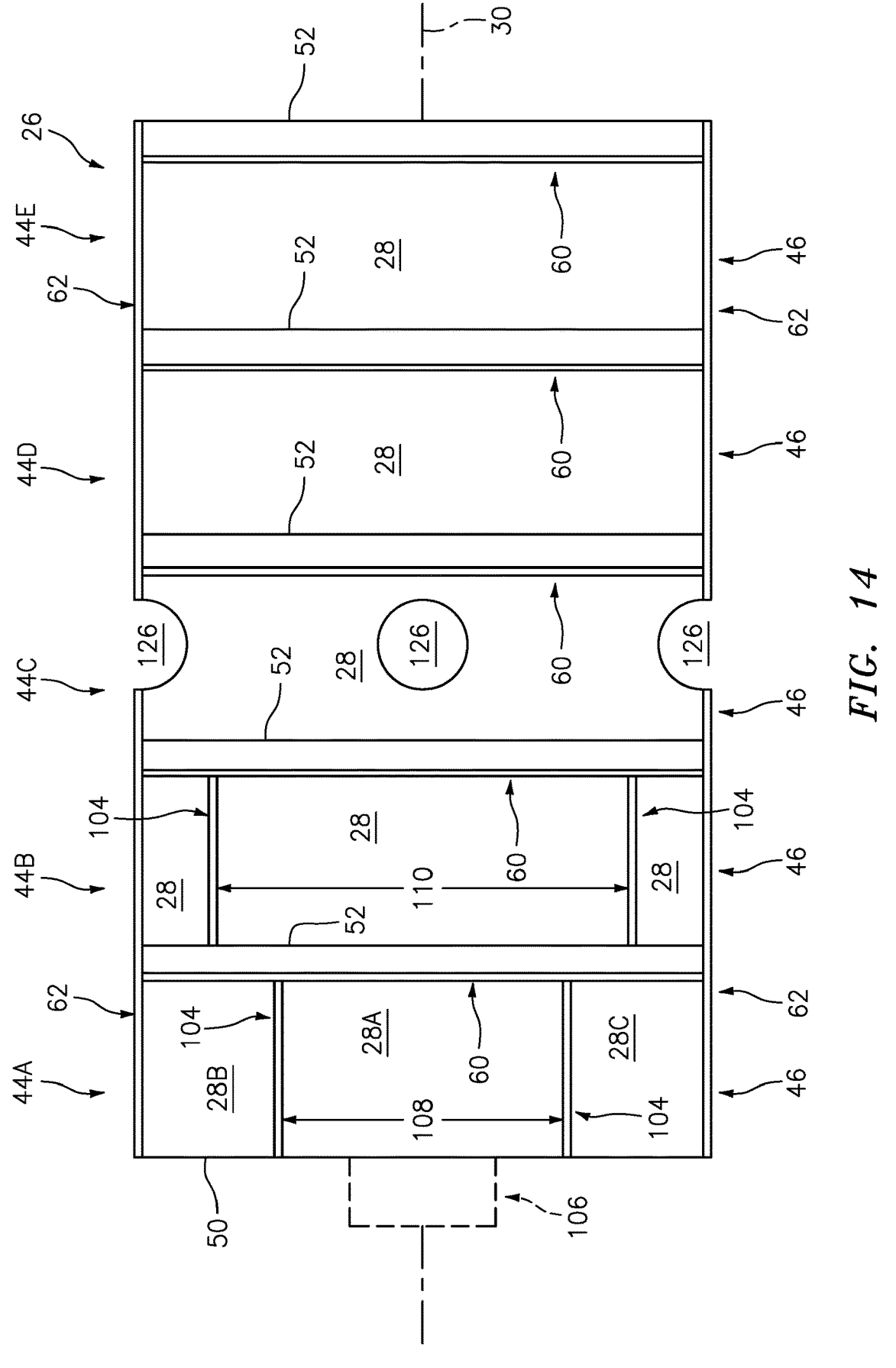
FIG. 14 is a plan view illustration of a lateral sector of the heat shield arranged with a fuel injector assembly.

In some embodiments, referring to FIG. 14, one or more or each of the heat shield panels 46 may include one or more internal longitudinal rails 104. Each of these internal longitudinal rails 104 of FIG. 14 extends longitudinally along the respective heat shield panel 46; e.g., from the lateral rail 60 to the panel first end 50. Each of the internal longitudinal rails 62 is thereby adapted to provide each heat shield panel 46 with multiple laterally adjacent cooling cavities (e.g., 28A-28B). This may thereby enable provision of increase cooling in different lateral sectors of the heat shield 26. For example, the central cooling cavity 28A may be circumferentially aligned with a fuel injector assembly 106 and, thus, receive additional cooling fluid. The shell 24, for example, may include more apertures (e.g., 84 and/or 86 in FIG. 7) above the central cooling cavity 28A than above the side cooling cavities 28B and 28C.

In some embodiments, the internal longitudinal rails 62 associated with one (e.g., an upstream) heat shield panel 46 may be spaced by a lateral first distance 108. The internal longitudinal rails 62 associated with another (e.g., an adjacent and/or downstream) heat shield panel 46 may be spaced by a lateral second distance 110 that is different (e.g., greater) than the lateral first distance 108.

In some embodiments, the heat shield panels 46 in a longitudinal row (e.g., the row shown in FIG. 14) may be configured together as a single monolithic body. The heat shield panels 46 in a common longitudinal row, for example, may share common longitudinal rails 62 which interconnect the various panel bases 58 together. Of course, in other embodiments, each heat shield panel 46 may be configured as a discretely formed body as generally described above.

In some embodiments, the number of heat shield panels 46 in each array 44 may be equal to the number of fuel injector assembly 106. With such an arrangement, a lateral center of each panel 46 may be laterally (e.g., circumferentially) aligned with a lateral center of a respective one of the fuel injector assemblies 106; e.g., as shown in FIG. 14. The present disclosure, however, is not limited to such an exemplary alignment nor such an exemplary 1:1 ratio of heat shield panels 46 in an array 44 to fuel injector assemblies 106. For example, in other embodiments, each heat shield panel 46 in one, some or each of the arrays 44 may be associated with two or more of the fuel injector assemblies 106.

Figure 15:
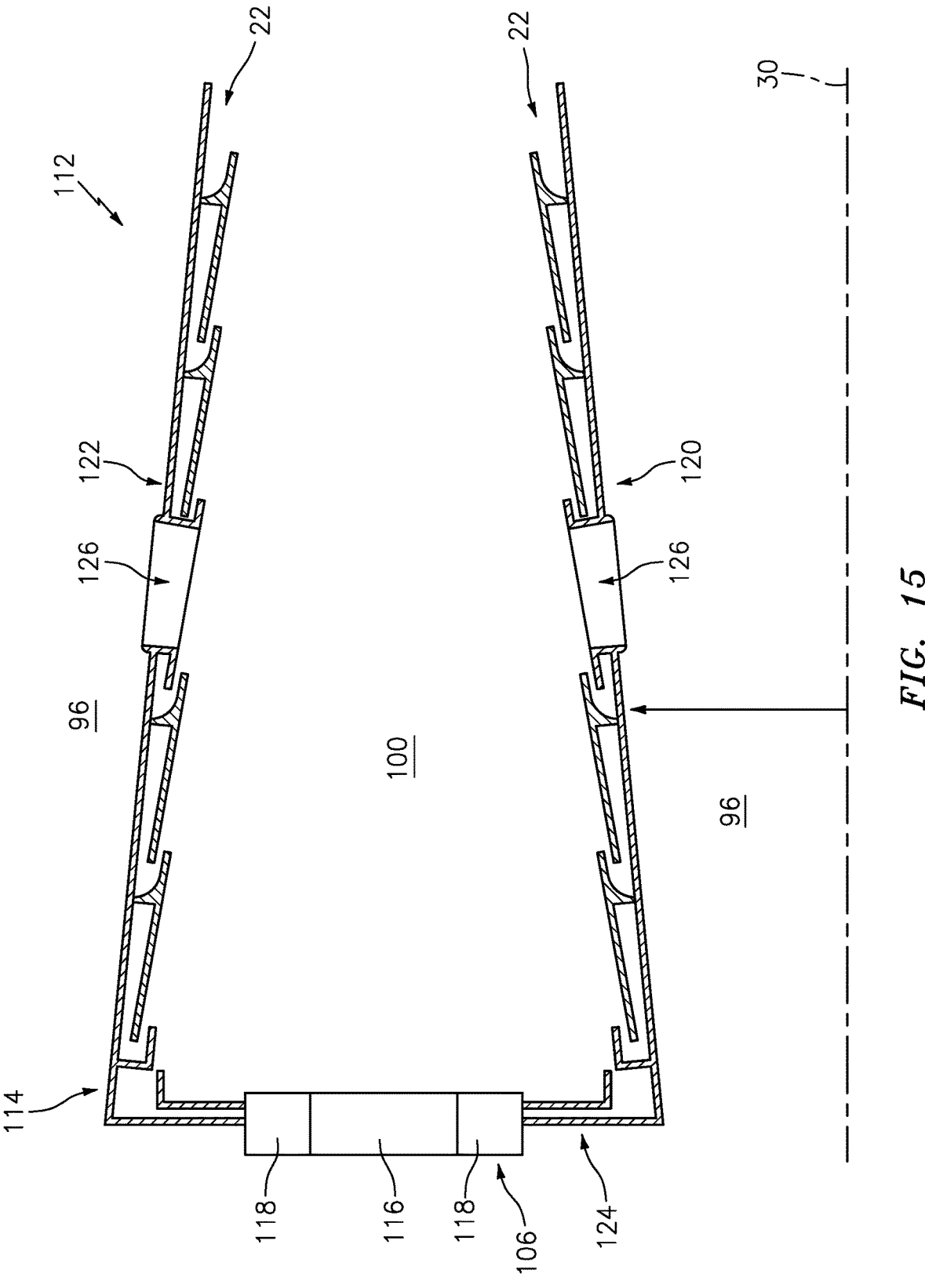
FIG. 15 is a partial side sectional illustration of a combustor.

FIG. 15 illustrates another assembly 112 for the gas turbine engine. This turbine engine assembly 112 includes a combustor 114 and the fuel injector assemblies 106. Briefly, each fuel injector assembly 106 may include a fuel injector 116 and a swirler 118 mated with the fuel injector 116.

The combustor 114 includes an inner combustor wall 120, an outer combustor wall 122 and a combustor bulkhead 124. The combustor 114 may be configured as an annular combustor. Each of the inner and outer combustor walls 120, 122, for example, may be a tubular wall that extends circumferentially around the axial centerline 30. Each of the combustor walls 120, 122 may be configured with the multi-walled structure 22 configuration described above. The combustor bulkhead 124 may be an annular wall that extends circumferentially around the axial centerline 30 and radially from the inner combustor wall 120 to the outer combustor wall 122.

In some embodiments, each combustor wall 120, 122 may be configured with one or more quench apertures 126. Each quench aperture 126 is formed by a tubular structure (e.g., a grommet), which may be configured as part of a respective one of the heat shield panels 46. Each quench aperture 126 extends radially through the respective combustor wall 120, 122.

Figure 16:
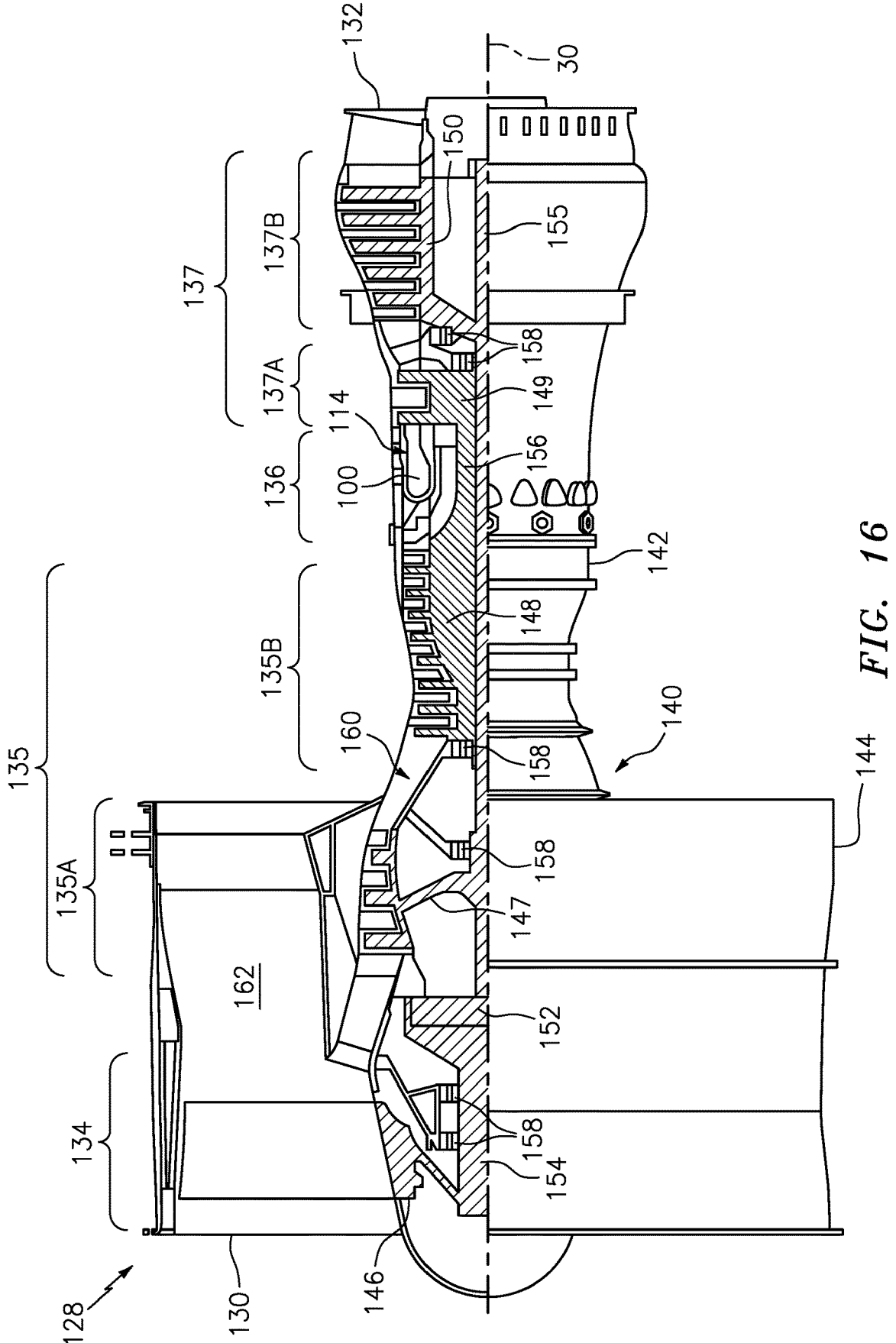
FIG. 16 is a side cutaway illustration of a gas turbine engine.

FIG. 16 is a side cutaway illustration of a geared turbine engine 128 with which the turbine engine assembly 20 of FIG. 1 and/or the turbine engine assembly 112 of FIG. 15 may be configured. The turbine engine 128 extends along an axial centerline (e.g., the centerline 30) between an upstream airflow inlet 130 and a downstream airflow exhaust 132. The turbine engine 128 includes a fan section 134, a compressor section 135, a combustor section 136 and a turbine section 137. The compressor section 135 includes a low pressure compressor (LPC) section 135A and a high pressure compressor (HPC) section 135B. The turbine section 137 includes a high pressure turbine (HPT) section 137A and a low pressure turbine (LPT) section 137B.

The engine sections 134-137B are arranged sequentially along the axial centerline 30 within an engine housing 140. This engine housing 140 includes an inner case 142 (e.g., a core case) and an outer case 144 (e.g., a fan case). The inner case 142 may house one or more of the engine sections

135A-137B; e.g., an engine core. The outer case 144 may house at least the fan section 134.

Each of the engine sections 134, 135A, 135B, 137A and 137B includes a respective rotor 146-150. Each of these rotors 146-150 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 146 is connected to a gear train 152, for example, through a fan shaft 154. The gear train 152 and the LPC rotor 147 are connected to and driven by the LPT rotor 150 through a low speed shaft 155. The HPC rotor 148 is connected to and driven by the HPT rotor 149 through a high speed shaft 156. The shafts 154-156 are rotatably supported by a plurality of bearings 158; e.g., rolling element and/or thrust bearings. Each of these bearings 158 is connected to the engine housing 140 by at least one stationary structure such as, for example, an annular support strut.

During operation, air enters the turbine engine 128 through the airflow inlet 130. This air is directed through the fan section 134 and into a core gas path 160 and a bypass gas path 162. The core gas path 160 extends sequentially through the engine sections 135A-137B. The air within the core gas path 160 may be referred to as "core air". The bypass gas path 162 extends through a bypass duct, which bypasses the engine core. The air within the bypass gas path 162 may be referred to as "bypass air".

The core air is compressed by the compressor rotors 147 and 148 and directed into the combustion chamber 100 of the combustor 114 in the combustor section 136. Fuel is injected into the combustion chamber 100 and mixed with the compressed core air to provide a fuel-air mixture. This fuel air mixture is ignited and combustion products thereof flow through and sequentially cause the turbine rotors 149 and 150 to rotate. The rotation of the turbine rotors 149 and 150 respectively drive rotation of the compressor rotors 148 and 147 and, thus, compression of the air received from a core airflow inlet. The rotation of the turbine rotor 150 also drives rotation of the fan rotor 146, which propels bypass air through and out of the bypass gas path 162. The propulsion of the bypass air may account for a majority of thrust generated by the turbine engine 128, e.g., more than seventy-five percent (75%) of engine thrust. The turbine engine 128 of the present disclosure, however, is not limited to the foregoing exemplary thrust ratio.

The turbine engine assembly 20, 114 may be included in various turbine engines other than the one described above. The turbine engine assembly 20, 114, for example, may be included in a geared turbine engine where a gear train connects one or more shafts to one or more rotors in a fan section, a compressor section and/or any other engine section. Alternatively, the turbine engine assembly 20, 114 may be included in a turbine engine configured without a gear train. The turbine engine assembly 20, 114 may be included in a geared or non-geared turbine engine configured with a single spool, with two spools (e.g., see FIG. 16), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
a wall comprising a shell, a heat shield and a cooling cavity;
the heat shield including a first panel and a second panel, the first panel is upstream of the second panel;
the first panel extending longitudinally between a first panel first end and a first panel second end, the first panel first end is upstream of the first panel second end, and the first panel including a first panel base and a first panel rail, the first panel first end is spaced a first panel longitudinal first distance from the first panel rail, the first panel second end is spaced a first panel longitudinal second distance from the first panel rail, and the first panel longitudinal first distance is greater than the first panel longitudinal second distance;
the second panel extending longitudinally between a second panel first end and a second panel second end, the second panel first end is upstream of the second panel second end, the second panel first end arranged between the shell and the first panel second end, such that
the second panel first end is spaced from the shell in a radial direction to form a first air gap,
the second panel first end is spaced from the first panel second end in the radial direction to form a second air gap, and
the second panel first end is spaced from the first panel rail of the first panel in an axial direction to form a third air gap and cooling cavity outlet configured as a slot,
the second panel including a second panel base and a second panel rail, and the second panel base comprising a first uninterrupted surface and a second uninterrupted surface, the first uninterrupted surface extending longitudinally from the second panel rail to the second panel first end, the second uninterrupted surface extending longitudinally from the second panel rail to the second panel second end, the second panel rail disposed a second panel longitudinal first distance from the second panel first end, the second panel rail disposed a second panel longitudinal second distance from the second panel second end, and the second panel longitudinal first distance greater than the second panel longitudinal second distance; and
the cooling cavity longitudinally bounded by the first panel rail and the second panel rail;
wherein the cooling cavity continuously extends through the first air gap, the third air gap, and the second air gap;
wherein the first panel base extends straight and linearly from the first panel first end to the first panel second end; and
wherein the second panel base extends straight and linearly from the second panel first end to the second panel second end.

2. The assembly of claim 1, wherein the first panel further includes a laterally extending stiffener connected to and projecting out from the first panel base at the first panel second end.

3. The assembly of claim 1, wherein the shell comprises an aperture configured to direct a jet of cooling fluid at the first uninterrupted surface.

4. The assembly of claim 3, wherein a centerline axis of the aperture is angularly offset from an interior surface of the shell by an acute angle.

5. The assembly of claim 3, wherein the aperture is further configured to direct the jet of cooling fluid in a direction longitudinally towards the second panel first end.

6. The assembly of claim 1, wherein the shell comprises an aperture configured to direct a jet of cooling fluid at a surface of the first panel base longitudinally between the first panel rail and the first panel second end.

7. The assembly of claim 6, wherein a centerline axis of the aperture is perpendicular to an interior surface of the shell.

8. The assembly of claim 1, wherein the shell comprises an aperture configured to direct a jet of cooling fluid at a surface of the second panel base longitudinally between the second panel rail and the second panel second end.

9. The assembly of claim 1, wherein the first uninterrupted surface is angularly offset from an interior surface of the shell that forms an outer periphery of the cooling cavity.

10. The assembly of claim 1, wherein at least a portion of the shell, which completely longitudinally overlaps an entirety of the first panel and an entirety of the second panel, has a straight, linear sectional geometry.

11. The assembly of claim 1, wherein the first panel includes a ramped portion at a corner between the first panel base and the first panel rail.

12. The assembly of claim 1, wherein the wall further include a pair of side rails that extend longitudinally along and are connected to the first panel and the second panel.

13. The assembly of claim 1, wherein at least the first panel and the second panel are formed together as a monolithic body.

14. The assembly of claim 1, wherein the first panel is formed as a discrete body from the second panel.

15. The assembly of claim 1, wherein
the first panel further includes a pair of laterally adjacent first panel rails that are laterally separated by a lateral first distance; and
the second panel further includes a pair of laterally adjacent second panel rails that are laterally separated by a lateral second distance that is different than the lateral first distance.

16. An assembly for a gas turbine engine, comprising:
a combustor wall comprising a shell, a heat shield and a cooling cavity;
the shell comprising a shell surface having one or more apertures;
the heat shield including a first panel and a second panel;
the first panel extending longitudinally a first longitudinal length between a first panel first end and a first panel second end, the first panel including a first panel base and a first panel rail that projects out from the first panel base and engages the shell surface, the first panel first end is spaced a first panel longitudinal first distance from the first panel rail, the first panel second end is spaced a first panel longitudinal second distance from the first panel rail, the first panel longitudinal first distance is greater than the first panel longitudinal second distance, and the first panel base extends straight and linearly from the first panel first end to the first panel second end;
the second panel extending longitudinally a second longitudinal length between a second panel first end and a second panel second end, the second panel including a second panel base and a second panel rail that projects out from the second panel base and engages the shell surface, and the second panel base extends straight and linearly from the second panel first end to the second panel second end; and the cooling cavity extending within the combustor wall from the shell surface to the first panel and the second panel;

wherein at least one of the one or more apertures is configured to direct a jet of cooling fluid between the shell surface and the second panel first end and within a portion of the cooling cavity between the shell surface and the second panel first end;

wherein the second panel first end projects longitudinally into a vertical gap formed between the shell surface and the first panel second end;

wherein at least a portion of the shell surface completely longitudinally overlaps the first panel along an entirety of the first longitudinal length and the second panel along an entirety of the second longitudinal length, and at least the portion of the shell surface has a straight, linear sectional geometry;

wherein the second panel rail is spaced a second panel longitudinal first distance from the second panel first end;

wherein the second panel rail is spaced a second panel longitudinal second distance from the second panel second end; and wherein the second panel longitudinal first distance is greater than the second panel longitudinal second distance.

17. The assembly of claim 16, wherein a slot is formed by and extends radially between the first panel portion of the first panel and the second panel portion of the second panel; and the combustor wall is configured to direct the cooling fluid through the slot out of the cooling cavity and into a combustion chamber and longitudinally along the second panel.

18. An assembly for a gas turbine engine, comprising:

a wall comprising a shell, a heat shield, a first cooling cavity and a second cooling cavity;

the heat shield including a first panel, a second panel and a third panel;

the first panel extending longitudinally between a first panel first end and a first panel second end, and the first panel including a first panel base and a first panel rail, the first panel first end is spaced a first panel longitudinal first distance from the first panel rail, the first panel second end is spaced a first panel longitudinal second distance from the first panel rail;

the second panel extending longitudinally between a second panel first end and a second panel second end, the second panel first end arranged between the shell and the first panel second end, such that the second panel first end is spaced from the shell in a radial direction to form a first air gap, the second panel first end is spaced from the first panel second end in the radial direction to form a second air gap, and the second panel first end is spaced from the first panel rail of the first panel in an axial direction, the second panel including a second panel base and a second panel rail;

the second panel base comprising and extending between a second panel uninterrupted interior surface and a second panel uninterrupted exterior surface, the second panel uninterrupted interior surface extending longitudinally from the second panel rail to the second panel first end, and the second panel uninterrupted exterior surface extending longitudinally from the second panel first end to the second panel second end;

the first cooling cavity longitudinally bounded by the first panel rail and the second panel rail;

the first cooling cavity continuously extending from the first air gap to the second air gap, and the second air gap forming a first cooling cavity outlet;

the third panel extending longitudinally between a third panel first end and a third panel second end, the third panel first end arranged between and spaced from the shell and the second panel second end, the third panel including a third panel base and a third panel rail;

the third panel base comprising and extending between a third panel uninterrupted interior surface and a third panel uninterrupted exterior surface, the third panel uninterrupted interior surface extending longitudinally from the third panel rail to the third panel first end, and the third panel uninterrupted exterior surface extending longitudinally from the third panel first end to the third panel second end;

the second cooling cavity longitudinally bounded by the second panel rail and the third panel rail.

19. The assembly of claim 18, wherein the second panel uninterrupted interior surface is configured without apertures and/or protuberances.

* * * * *